United States Patent
Louvigne et al.

(10) Patent No.: US 9,140,584 B2
(45) Date of Patent: Sep. 22, 2015

(54) PASSIVE, REVERSIBLE DEFORMATION SENSOR

(75) Inventors: Pierre-Francois Louvigne, Sceaux (FR); Patrice Minotti, Gennes (FR); Paul Vescovo, Besancon (FR); Vincent Walter, Besancon (FR)

(73) Assignees: ETAT FRANCAIS REPRESENTE PAR LE DELEGUE GENERAL POUR L'ARMEMENT, Bagneux (FR); SILMACH, Besancon (FR)

( * ) Notice: Subject to any disclaimer, the term of this patent is extended or adjusted under 35 U.S.C. 154(b) by 99 days.

(21) Appl. No.: 14/113,306

(22) PCT Filed: Apr. 20, 2012

(86) PCT No.: PCT/FR2012/000155
§ 371 (c)(1),
(2), (4) Date: Oct. 22, 2013

(87) PCT Pub. No.: WO2012/143627
PCT Pub. Date: Oct. 26, 2012

(65) Prior Publication Data
US 2014/0060208 A1 Mar. 6, 2014

(30) Foreign Application Priority Data

Apr. 22, 2011 (FR) .................................... 11 01274

(51) Int. Cl.
*G01D 1/00* (2006.01)
*G01D 9/00* (2006.01)
(Continued)

(52) U.S. Cl.
CPC .. *G01D 9/00* (2013.01); *G01B 5/30* (2013.01); *G01K 7/01* (2013.01); *G01Q 80/00* (2013.01)

(58) Field of Classification Search
CPC ....... G06M 1/041; G06M 1/083; G06M 3/12; G01N 2021/1731; G01B 5/30; G01D 9/00; G01K 7/01; G11B 11/03
USPC .................. 73/760, 862.53, 862.541, 862.623
See application file for complete search history.

(56) References Cited

U.S. PATENT DOCUMENTS 5,452,335 A 9/1995 Slater et al.
6,035,826 A * 3/2000 Matsuoka ................ 123/406.62
(Continued)

FOREIGN PATENT DOCUMENTS

EP  1 998 145 A2  12/2008
FR  2 875 324 A1   3/2006
FR  2 893 139 A1   5/2007

OTHER PUBLICATIONS

French Search Report dated Apr. 22, 2011, from corresponding to FR application.
(Continued)

*Primary Examiner* — Max Noori
(74) *Attorney, Agent, or Firm* — Young & Thompson

(57) ABSTRACT

The present invention relates to the field of microsensors, and particularly to a passive and reversible deformation sensor, specifically cycles of deformations in a direction OX of a structure, specifically during cycles of temperatures or mechanical stresses to which the structure is subjected, this sensor including elements (4, 5, 6) for detecting and, preferably, counting cycles of variations in the distance between two points or areas of a structure, these elements including a support having first and second portions (41, 44) attachable to, respectively, either of the two points or areas of the structure, wherein the detecting elements are associated with each of the first and second portions of the support, sensor characterized by in that the detecting elements include elements ($54_1, 54_2, 54_3, 55_1, 55_2, 55_3, 56_1, 56_2, 56_3$) for distinguishing between at least two different thresholds of cycles of variations in distance.

10 Claims, 9 Drawing Sheets

(51) Int. Cl.
  *G01B 5/30* (2006.01)
  *G01K 7/01* (2006.01)
  *G01Q 80/00* (2010.01)

(56) References Cited

U.S. PATENT DOCUMENTS

| 7,020,972 B2* | 4/2006 | Graf et al. ............... 33/501.7 |
| 2009/0090787 A1* | 4/2009 | Crosby et al. ............. 235/91 R |
| 2010/0078490 A1* | 4/2010 | Fenlon ..................... 235/91 R |
| 2012/0240926 A1* | 9/2012 | Kaar et al. ................ 128/203.12 |
| 2013/0098981 A1* | 4/2013 | Yeh ........................... 235/103 |

OTHER PUBLICATIONS

International Search Report dated Jul. 18, 2012, from corresponding PCT application.

* cited by examiner

PASSIVE, REVERSIBLE DEFORMATION SENSOR

CROSS-REFERENCE TO RELATED APPLICATIONS

This application is a U.S. National Phase application under 35 U.S.C. §371 of International Application No. PCT/FR2012/000155, filed Apr. 20, 2012, which claims priority of French patent application no. 1101274 filed on Apr. 22, 2011.

FIELD OF THE INVENTION

The present invention relates to the field of microsensors, and particularly to a microsensor able to detect, and preferably also to count, cycles of variations in the distance between two points or areas of a structure subjected to a repeated external action, for example cycles of temperatures or mechanical stresses as for example the number of passes of vehicles across a bridge, generating a known stress level in the structure.

DESCRIPTION OF THE RELATED ART

In this respect, U.S. Pat. No. 5,452,335 is known, which describes several examples of sensor of cycles of temperature, of which, on one hand, a first example, shown in FIGS. 1 and 2 and in column 4, of a passive sensor able to detect and count cycles of temperature in relation to a preset temperature threshold and, on the other hand, a second example, shown in columns 10 and 11 with respect to FIGS. 10 to 12 and which relates to an electronic sensor for detecting and counting cycles of temperature in relation to two temperature thresholds, wherein this sensor comprises an electrical power supply and a preprogrammed microprocessor.

In the field of road infrastructures, such as for example a bridge, in order to determine the structural evolution it is important to know the number of vehicles that have crossed it.

In this respect, patent FR2875324 is known, which describes a vehicle pass counter comprising essentially a microphone arranged in an acoustic cavity and connected to means for processing signals emitted from the microphone. The signal characteristic of a motor vehicle is thus detected by such a device.

Other devices are known, operating with ultrasounds, pressure sensors or image sensors and to which processing means are associated.

These devices have, as the second above-mentioned example, several disadvantages:

The first one relates to their service life: it is limited, at most, to the service life of the supply means, namely batteries, that is about one or two years.

The second one relates to the impossibility to use them with a complete pyrotechnic security. Indeed, the presence of a potential difference, and thus of an electrical current, creates a risk of spark formation or short circuit which could generate a fire or even an explosion in presence of explosive material.

The third one relates to their sensitivity to magnetic fields, particularly because of the generation of induced currents in the electrical circuits and of the degradation of the electronic components resulting therefrom. In addition, in most cases, these sensors and associated processing means have a large size, typically of several tens centimeters, thus making them very visible and which explains why they are subject to acts of vandalism.

To solve these problems, patent application EP1998145 describes a reversible and passive microsensor for counting the number of cycles of loads to which a structure is subjected, which could for example correspond to the number of cycles of temperature, mechanical tensile, compression and/or bending loads generated, for example, by the crossing of movable vehicles on this structure, the size of which advantageously does not exceed 5 cm, and preferably 2 cm, for its largest dimension, and having an almost unlimited service life, which could be used in pyrotechnic security, having no sensitivity to electromagnetic fields and enabling a fault-free counting of this number of cycles or passes.

Reversible sensor refers to a sensor able to detect a cycle of variations in the distance without deteriorating itself, thus able to then detect another cycle.

Passive means refer to means operating without any power source, contrary to so-called active means used in the above-mentioned patent applications and which use a power source, namely an electrical power supply.

This microsensor is provided with means for detecting and counting cycles of variations in the distance between two points or areas of a structure, these means comprising a support having a first portion and a second portion, each having an anchor area, wherein these anchor areas are attachable to, respectively, either of said two points of areas of the structure and consist in blocks, notches and/or bores and have smaller dimensions than the first and second portions, the counting means being associated with each of said first and second portions of the support.

More specifically, and as shown in FIGS. 1a and 1b, this passive microsensor for detecting and counting the number of passes of vehicles comprises a support 101, essentially with a U shape, comprising thus a first portion 102 and a second portion 103 connected to each other by a third portion 104 forming the base of the U, and counting means 105 arranged on the support and comprising at least a first teethed wheel 106 disposed on said first portion 102 of the support 101 and, on one hand, a beam 107 for driving this first teethed wheel 106, attached, at one end 108 of the ends 108, 109 thereof, to said second portion 103 and provided, at the other end 109 thereof, with a tooth 110, shown in FIG. 10 and able to form a gearing 111 with the teeth 112 of the first teethed wheel 106, and, on the other hand, a reverse running stop device 113 for the first teethed wheel 106 and such that the first portion 102 becoming closer to the second portion 103 of the support 101 causes the teethed wheel 106 to be driven by the driving tooth 110 of the driving beam 107 while the distancing of these two portions causes the first teethed wheel 106 to be held by the reverse running stop device 113 and the tooth 110 of the driving beam to be retracted on a tooth 112 of the first teethed wheel 106.

As shown in FIG. 1a, the first and second portions are provided with first and second anchor areas, respectively 224 and 225, formed by bores, in each of which a screw can be inserted for attaching the microsensor on the structure to be analysed, such as for example the parapet of a bridge. The bores 224 and 225 have a diameter slightly larger than that of said screws.

In this exemplary embodiment, the first and second anchor areas 224, 225 are disposed respectively according to a first axis Y1 and a second axis Y2 parallel to each other and separated by a distance L. In a preferred manner enabling to minimize the size of the sensor, these anchor areas are arranged such that the length L is as long as possible and such that the deformation of the structure between the axes Y1 and Y2 is at least equal to the pitch P of the teeth of the counting wheel. Indeed, when the microsensor is attached to a structure which is subjected to a deformation, the variation in the distance between these two anchor areas 224 and 225, thus between the axes Y1 and Y2, is proportional to this length L. As a result, for a given pitch P of the teeth of the counting wheel, and in case of the use of only one driving beam, the deformation of the structure between the axes Y1 and Y2 must at least be equal to P and preferably lower than or equal to 1.5×P.

As shown in FIG. 1b, faces 113, 134 and 135 of respective portions 102, 103 and 104 of the support 101 are planar and arranged in the same plane and adapted to be pressed against the structure to be analysed via said screws.

In this exemplary embodiment, the third portion 104 of the support has itself a reversed U-shape with a thick base 136. This shape enables to have smaller sections at the legs of the U of this beam than at the base 136, and a break would occur at one of the legs, and thus in a direction parallel to that of the normal movement of the first and second portions, in case of a significant force is applied at this third portion, thus avoiding any relative movement between these portions in the normal direction of the movement and avoiding a potential offset between the teethed wheel 106 and the tooth 110 of the driving beam 107. In this type of microsensor, the axis of the counting wheel is arranged on the axis Y1 of the first portion 102, and the driving beam 107 is integral with the second portion 103.

When a structure is subjected to different types of stresses which can generate variable deformations, it may be interesting to distinguish several deformation categories corresponding to different detection thresholds. On a bridge, several microsensors, such as the microsensor of FIGS. 1a and 1b, can be attached, each comprising a counting wheel with a tooth pitch different from that of the others. Thus, one of them can count only the passes of trucks of more than 20 tons, another can count only vehicles of more than 3.5 tons and a third one can count all vehicles of more than one ton. Several identical sensors can also be used: indeed, a bridge being subjected to bending, these sensors can be arranged at distances different from the neutral fiber of the bridge so as to detect different events.

However, where the structure subjected to these deformations is of a small size or has a reduced potential implantation area, and where several detection thresholds must be performed, its surface may not be sufficiently large to arrange as many different microsensors as different thresholds to be detected.

The invention intends to solve this disadvantage by providing a microsensor having all the above-mentioned advantages described in the application EP1998145 as well as the advantage of detecting several thresholds.

BRIEF SUMMARY OF THE INVENTION

The solution which is provided is a reversible and passive deformation sensor, specifically for cycles of deformations in a direction OX of a structure, specifically during cycles of temperature or mechanical stresses to which said structure is subjected, this sensor comprising:
means for detecting and, preferably also means for counting, cycles of variations in the distance between two points or areas of a structure,
a support having first and second portions attachable to, respectively, either of said two points or areas of the structure, wherein the detecting means are associated with each of said first and second portions of the support, and this sensor being characterized in that the detecting means comprise means for distinguishing between at least two different thresholds of cycles of variations in distance.

According to a particular feature, the detecting means comprise at least a first and a second detecting assembly, each comprising at least a first teethed wheel integral with one of the first and second portions and, on one hand, a beam for driving this teethed wheel made integral, directly or indirectly, at one of the end of the beam, with the other of the first and second portions and comprising, at the other end of the beam, a tooth able to form a gearing with the teeth of this first teethed wheel, wherein the tooth pitch of the first teethed wheel of the first assembly being different from the pitch of the first teethed wheel of the second assembly.

According to an additional feature enabling to obtain a sensor with a low surface footprint, characterized in that the first and second assemblies are superimposed.

According to a feature, the first and second assemblies are juxtaposed.

According to a preferred feature, said first and second portions of the support have a L shape and are arranged head-to-foot, the bases of the Ls forming an anchor area and one of them being located at one side of the support and the other at the opposite side of the support.

According to a feature facilitating the positioning of the support on a structure, the ends (37, 38) of said first and second portions of the support are connected to each other by an elastic element.

According to a particular feature, a sensor according to the invention comprises sequentially, in a direction OX, a first anchor area integral with one of said first and second portions of the support, a first detecting assembly, a second detecting assembly, even a third, a fourth, etc. assembly, and finally a second anchor area integral with the other portion.

According to another feature enabling to detect and count cycles of deformations, a sensor according to the invention is provided with a reverse running stop device associated with the first teethed wheel, comprising for example a beam integral, at one of the ends of the beam, with the first support or with the first portion of the support and comprising, at the other end of the beam, at least one tooth able to mesh with the teeth of the teethed wheel and, preferably, the reverse running stop device comprises a tooth able to mesh with said first teethed wheel, this tooth as well as the one of the driving beam and these of the first teethed wheel each comprising a radial surface and a tilted surface connecting the end of the radial surface of this tooth to the base of the radial surface of the next tooth.

According to a particular feature, each assembly is provided with 9-shaped driving means, having a first O-shaped rigid portion attached to the second portion of the support, a second elastic portion one end of which is integral with the first portion while the opposite end is integral with a third portion provided with a primary beam and a secondary beam, this latter being provided with a tooth at its free end, and, preferably, the first portion of the support is provided with a stop able to restrict, directly or indirectly, the stroke of said secondary beam.

BRIEF DESCRIPTION OF THE SEVERAL VIEWS OF THE DRAWING

Other advantages and features of the invention will become apparent in the description of several alternative embodiments of the invention with reference to the appended drawings, in which:

FIGS. 9a and 9b show another alternative embodiment of the invention, wherein FIG. 9a is a longitudinal sectional view along OX passing through the main axis of the teethed wheels while FIG. 9b is a side view.

DETAILED DESCRIPTION OF THE INVENTION

Figure 1A:
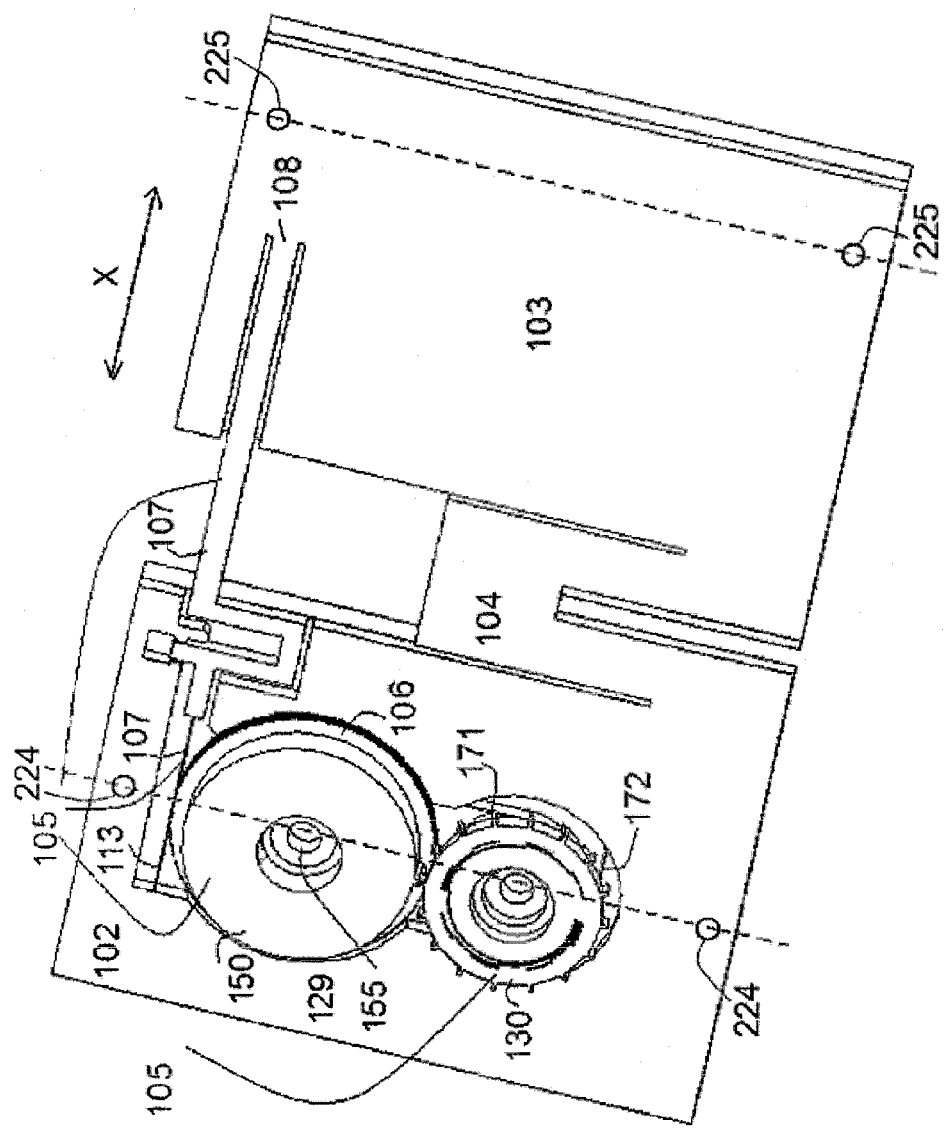
FIGS. 1a and 1b show a passive microsensor for detecting and counting the number of passes of vehicles.
Figure 1B:
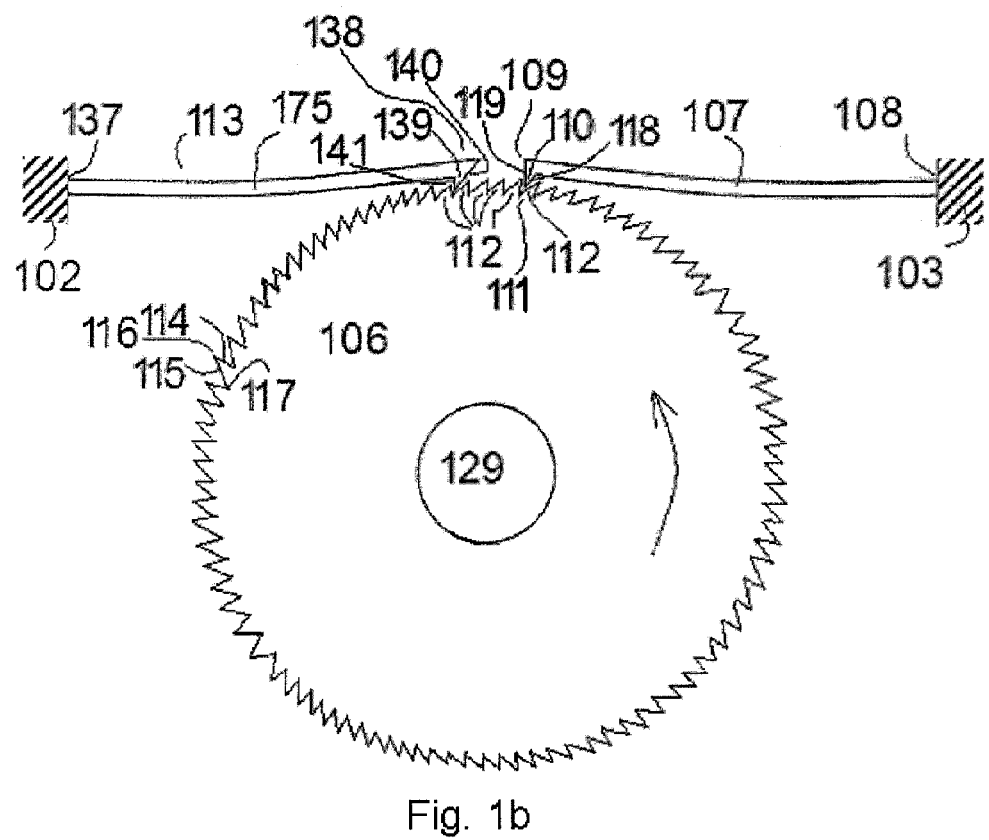
Figure 2:
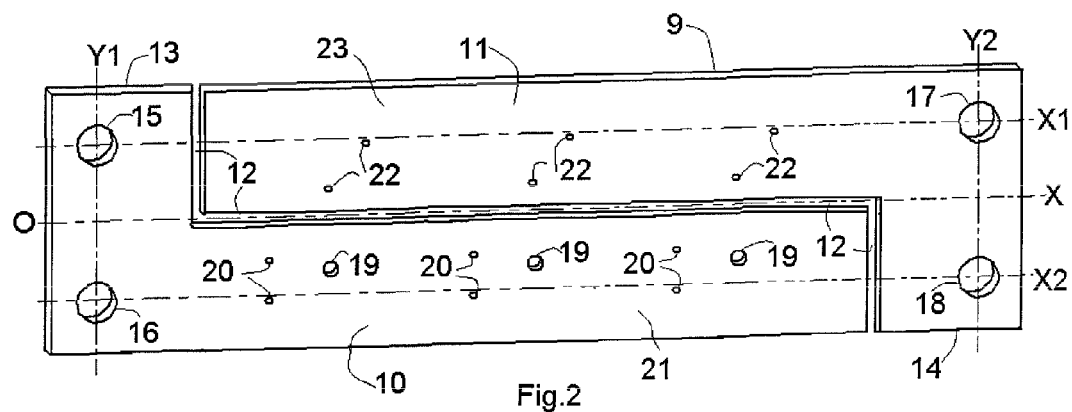
FIG. 2 shows a diagram of a first alternative embodiment of a support 9 usable in a reversible and passive sensor for deformations in a direction OX of a structure according to the invention.

FIG. 2 shows a diagram of a first alternative embodiment of a support 9 usable in a reversible and passive sensor of deformations in a direction OX of a structure according to the invention.

This support 9 is provided with two L-shaped sub-assemblies 10, 11, arranged head-to-foot and separated by a gap 12 and respective bases 13, 14 of which are, in part, anchor areas for anchoring the support 9 on the structure to be monitored.

In this exemplary embodiment, these bases 13, 14 each comprise two bores 15, 16 and 17, 18. The axes Y1 and Y2 passing respectively through the centers of the bores 15, 16 and 17, 18 are perpendicular to the axis OX while the axes X1 and X2 passing respectively through the centers of the bores 15, 17 and 16, 18 are parallel to the axis OX.

The second portions 21, 23 of the Ls perpendicular to the respective bases 13 and 14 are positioned along the axis OX.

The second portion 21 of the first sub-assembly 10 is provided with three bores 19 evenly distributed along the axis OX as well as three pairs of bores 20, wherein the axis passing through the centers of a pair of bores is parallel to the axis Y1 and wherein each of the pairs is associated with one of the bores 19. Each bore 20 is adapted to accommodate a pin protruding from the support and capable of enabling a prepositioning of reverse running stop means.

The second portion 23 of the second sub-assembly 11 is provided with three pairs of bores 22 also distributed along the axis OX, wherein each of the pairs 22 is associated to one of the bores 19. Each bore 22 is adapted to accommodate a pin protruding from the support and capable of enabling a prepositioning of driving means.

When such a support is attached to a structure, for example by bonding or by screws, it is preferable to insert shims in the gap 12 to allow an accurate positioning of the sub-assemblies 10, 11 with respect to each other.

Figure 3:
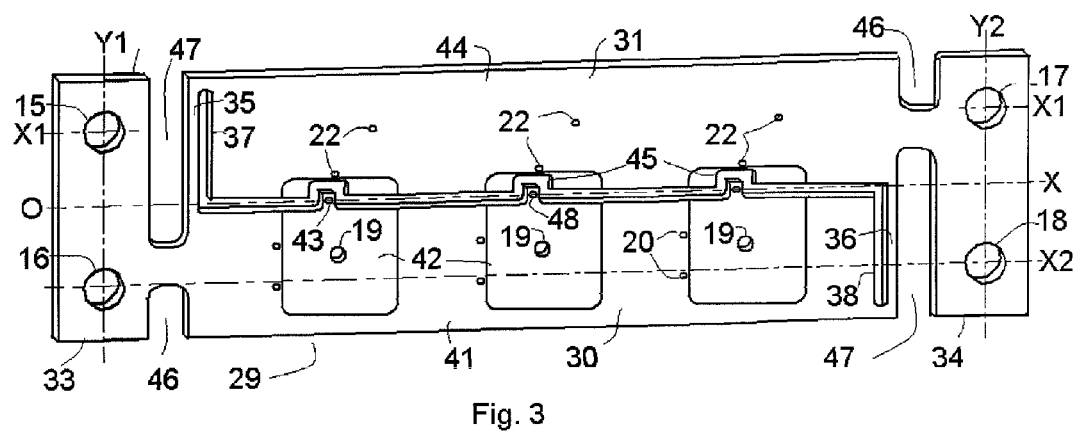
FIG. 3 shows a diagram of a second alternative embodiment of a support 9 usable in a reversible and passive sensor for deformations in a direction OX of a structure according to the invention.

FIG. 3 shows a diagram of a second alternative embodiment of a support 29 usable in a reversible and passive sensor for deformations in a direction OX of a structure according to the invention.

This support 29 is provided with first and second L-shaped sub-assemblies 30, 31 arranged head-to-foot and separated essentially longitudinally along the axis OX by a gap 32, respective bases 33, 34 of which are, in part, anchor areas for anchoring the support 29 on the structure to be monitored.

As in the above example, these bases 33, 34 each comprises two bores 15, 16 and 17, 18. The axes Y1 and Y2 passing respectively through the centers of the bores 15, 16 and 17, 18 are perpendicular to the axis OX while the axes X1 and X2 passing respectively through the centers of the bores 15, 17 and 16, 18 are parallel to the axis OX.

Furthermore, these first and second longitudinal portions 41; 44 are connected to each other, at the ends 37, 38 thereof, by an elastic element, in this case a material strand 35 and 36.

The second portion 41 of the first sub-assembly 30 is provided with three bores 19 evenly distributed along the axis OX as well as three pairs of bores 20, wherein the axis passing through the centers of a pair of bores is parallel to the axis Y1 and wherein each of the pairs is associated with one of the bores 19. Each bore 20 is adapted to accommodate a pin protruding from the support and capable of enabling a prepositioning of reverse running stop means.

This second portion 41 comprises as many substantially square-shaped recesses 42 as bores 19, each recess being centered about one of the bores 19. It also comprises three crenels 43 protruding from the lateral surface of the second portion 41 of the first sub-assembly 30 opposite to the second portion 44 of the second sub-assembly 31. For each of the bores 19, the axis passing through its center and parallel to the axis Y1 is also an axis of symmetry of one of the crenels 43. Each of these crenels comprises, in the median portion thereof, a bore 48.

The second portion 44 of the second sub-assembly 31 is provided with three pairs of bores 22 distributed as the bores 19 along the axis OX, each of the pairs 22 being associated with one of the bores 19. Each bore 22 is adapted to accommodate a pin protruding from the support and capable of enabling a prepositioning of reverse running stop means.

In addition, the lateral surface of the second portion 44 of the second sub-assembly 31 opposite to the second portion 41 of the first sub-assembly 30 comprises notches 45 which have dimensions larger than that of the crenels 43 and adapted to allow the insertion of crenels therein.

Each of the bases 33, 34 is partially separated from the corresponding second portion of the L by two notches 46, 47 which are coaxial and facing to each other.

The small notches 46 are not absolutely necessary, but they have the following advantages:
- facilitating the rotation of the 2 anchor areas in relation to each other. Indeed, when the monitor is installed on a structure which is subjected to bending, the right sections are rotating. Such an arrangement, by providing an elasticity (compliance), therefor allows to avoid an unnecessary increase of the stresses.
- centering of the base with respect to the second corresponding movable portion of the support,
- leaving, at the bases, only the material necessary to support the tensile or compression loads.

The large notches 47 enable to create the elastic elements, namely material strands 35, 36 for making the sub-assemblies 30, 31 integral to each other.

Figure 4B:
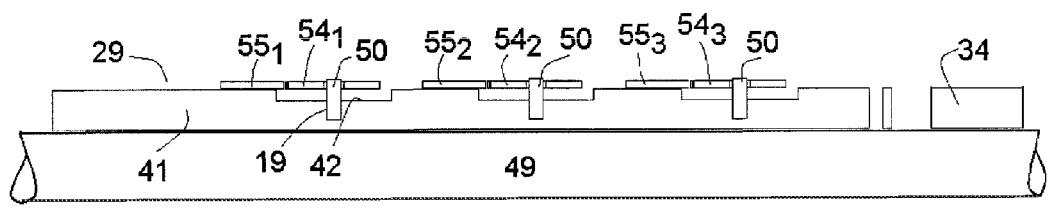
FIG. 4b shows a sectional view of the sensor along axis BB' in FIG. 4a, this sensor being attached on a structure to be monitored.
Figure 4A:
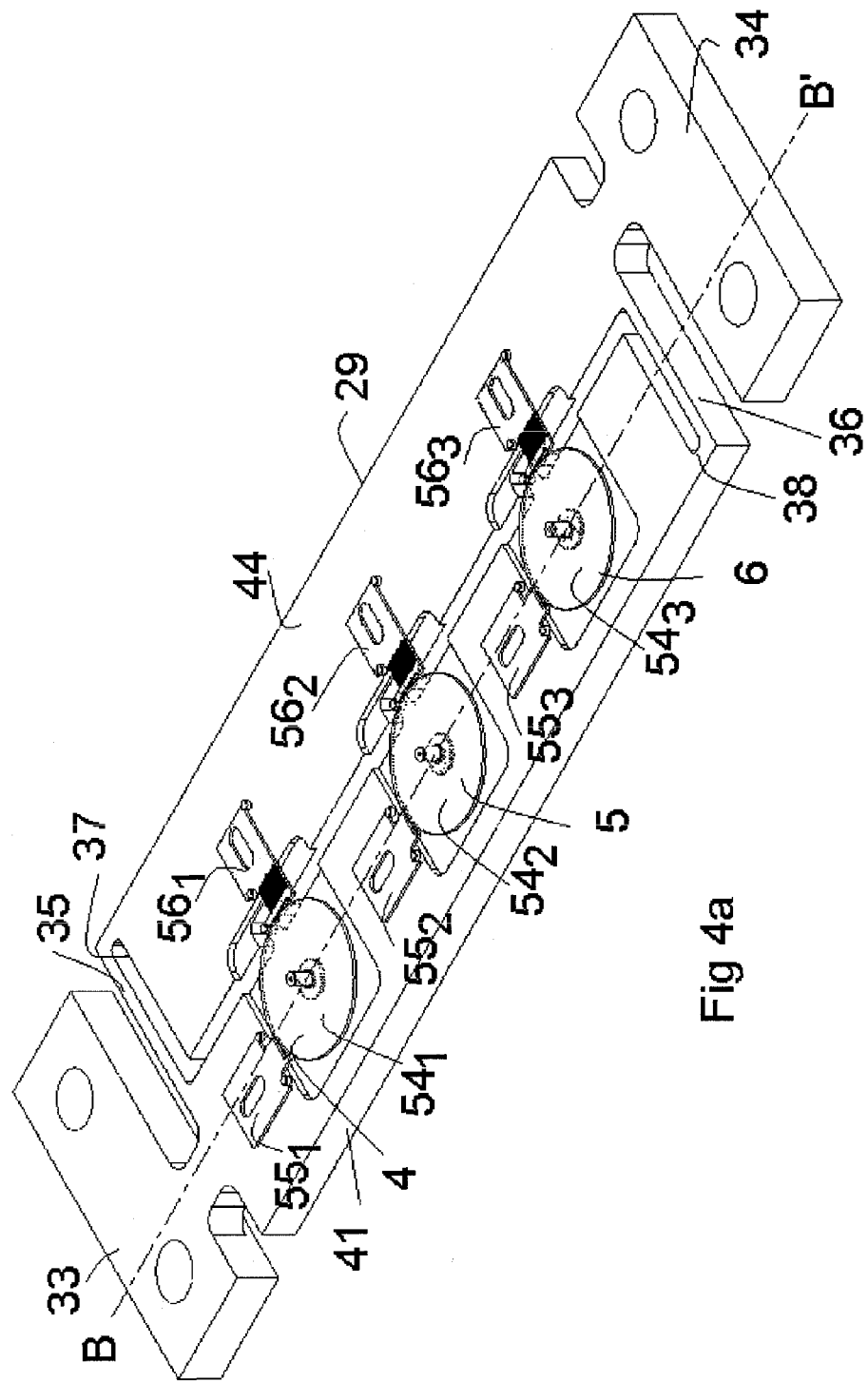
FIG. 4a shows a perspective view of the support of FIG. 3 on which detecting and counting means have been arranged.
Figure 4C:
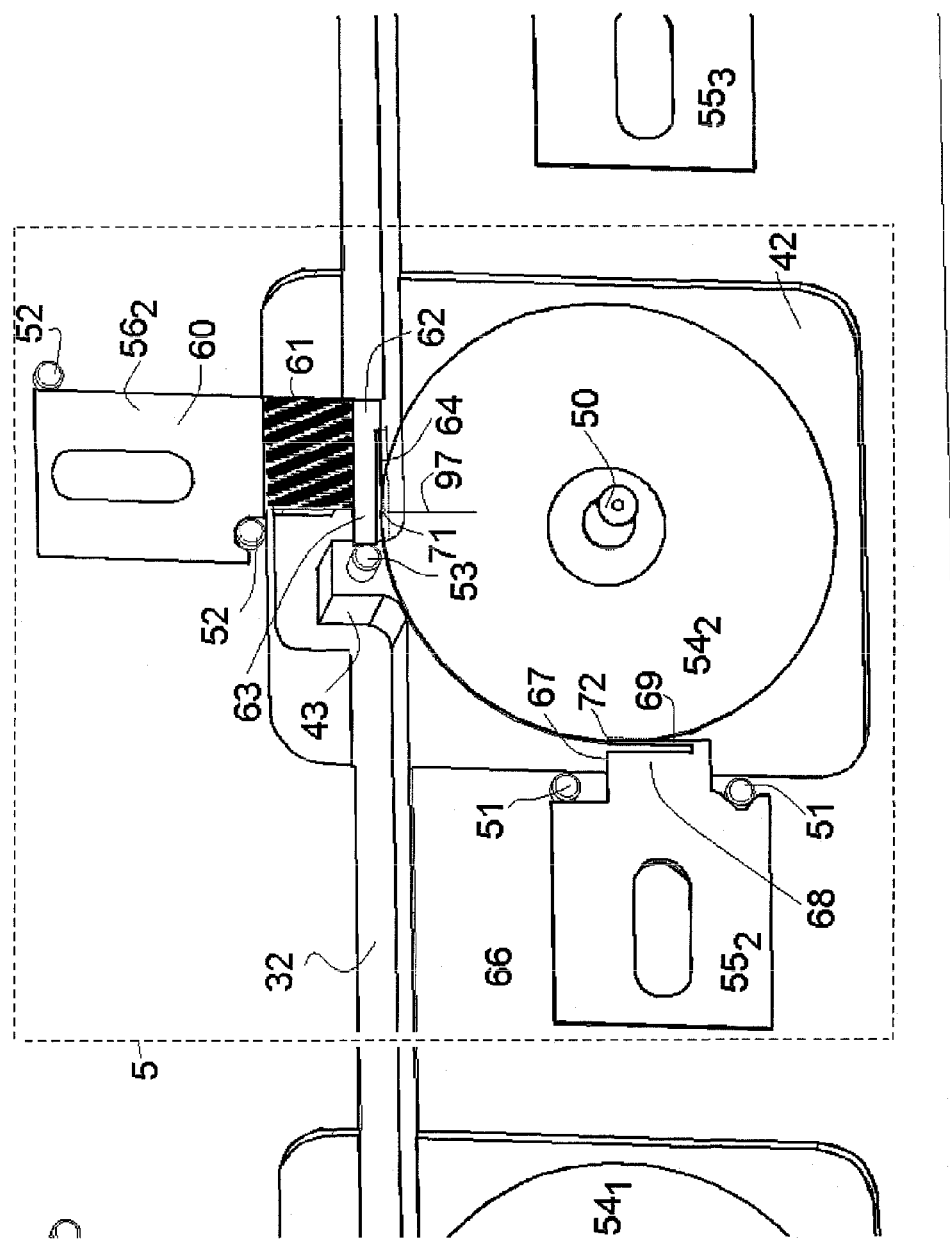
FIG. 4c shows an enlarged view of one of the detecting and counting assemblies.

FIG. 4a shows a perspective view of the support of FIG. 3 on which detecting and counting means have been disposed, while FIG. 4b shows a sectional view of the sensor along the axis BB' of FIG. 4a, this sensor being attached on a structure to be monitored, and FIG. 4c shows an enlarged view of one of the detecting and counting sub-assemblies.

On the support 29 in FIG. 3, three assemblies 4, 5, 6 are arranged, each comprising:
- pins 50, 51, 52, 53 press fitted in the bores 19, 20, 48 and 22 and protruding from the support 29 and serving as stop or rotation axis.
- a teethed wheel $54_1$, $54_2$ or $54_3$,
- reverse running stop means $55_1$, $55_2$ or $55_3$
- driving means $56_1$, $56_2$ or $56_3$.

In order to allow the detection of several different deformation thresholds, the teethed wheels $54_1$, $54_2$ or $54_3$ have a tooth pitch different from a wheel to another.

FIG. 4c shows an enlarged view of the assembly 5. This latter comprises:
- pins 50, 51, 52, 53 press fitted in the bores 19, 20, 48 and 22 and protruding from the support 29 and serving as stop or rotation axis.
- a teethed wheel $54_2$ with a tooth pitch equal to p2,
- reverse running stop means $55_2$,
- driving means $56_2$.

Figure 5:
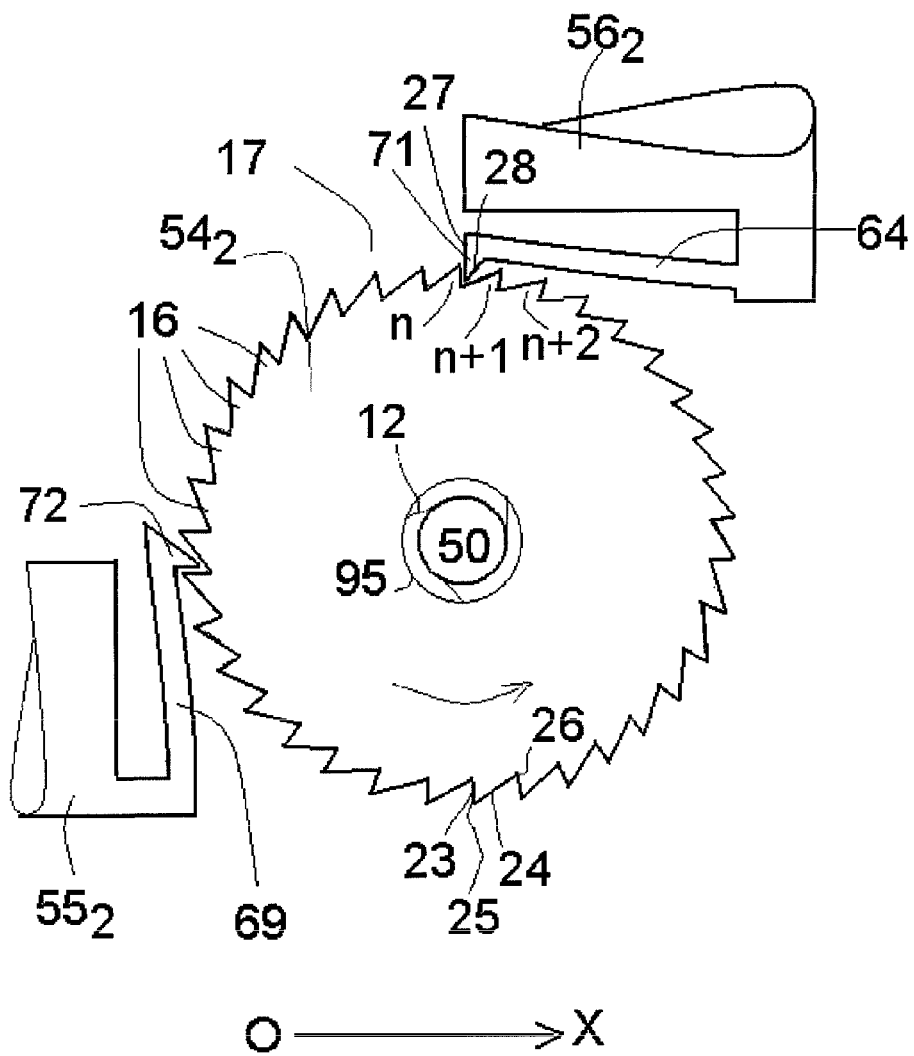
FIG. 5 shows a partial detailed diagram of one of the assemblies.

The driving means $56_2$ comprise a 9-shaped plate, comprising:
- a first O-shaped rigid portion 60 attached to the second portion 44 of the second sub-assembly 31 of the support 29, the central opening of this first portion being formed by a slotted hole,
- a second elastic portion 61, one end of which is integral with the first portion while the opposite end is integral with a third portion 62,
- the third portion 62, comprising a primary L-shaped beam 63, one of the lateral faces of which is attached to said second portion 61 while the base is integral with a secondary beam 64 with substantially the same length as the primary beam and parallel to this latter, but being thinner and comprising, as shown in FIG. 5, a tooth 71 at the end thereof, this tooth being able, as shown in FIG. 5, to form a pawl-type gearing with the teethed wheel $54_2$. This third portion 62 thus forms a U, main legs of which are formed by said primary and secondary beams 63 and 64.

Furthermore, the lateral face 65 of the first portion 60, a part of which is integral with the second elastic portion 61, is provided with a notch with substantially the same length as the pins 52, and the shape of this first portion as well as the positioning of the pins 52 on the support enable to perfectly preposition these driving means before attaching them, for example by bonding or screwing, on the support 29.

The reverse running stop means $55_2$ have a plate shape and comprise:
- a first O-shaped rigid portion 66 attached to the second portion 41 of the first sub-assembly 30 of the support, the central opening of this first portion being formed by a slotted hole,
- a second portion 67 with smaller dimensions than that of the first portion and comprising a primary L-shaped beam 38, one lateral face of which is attached to said first portion 66 while the base is integral with a secondary beam 69 with substantially the same length as the primary beam and parallel to this latter, but being thinner and comprising, as shown in FIG. 5, a tooth 72 at the end thereof, this tooth being able, as shown in FIG. 5, to form a pawl-type gearing with the teethed wheel $54_2$. This second portion thus forms a U, main legs of which are formed by said primary and secondary beams 68 and 69.

Furthermore, the lateral face 70 of the first portion 66, a part of which is integral with the second portion 37, is provided with a notch 70 with substantially the same dimension as the diameter of the pins 51, and the shape of this lateral face 70 as well as the positioning of the pins 52 on the support enable to perfectly preposition these driving means before attaching them, for example by bonding or screwing, on the support 29.

In this exemplary embodiment, the first and second anchor areas 33, 34 are respectively arranged along a first axis Y1 and a second axis Y2 parallel to each other and separated by a distance L. In a preferred manner enabling to minimize the size of the sensor, these anchor areas are arranged such that the length L is as long as possible and such that the deformation of the structure between the axes Y1 and Y2 is at least equal to the pitch p of the teeth of the teethed wheel. Indeed, when the microsensor is attached on a structure subjected to a deformation, the variation in the distance between the two anchor areas 33 and 34, thus between the axes Y1 and Y2, is proportional to this length L. As a result, for a given pitch p of the teeth of the teethed wheel, and in case of the use of only one driving beam associated with this wheel, the deformation of the structure between the axes Y1 and Y2 must be at least equal to p. Furthermore, the function of the pin 53 inserted in the bore 48 of the crenel 43 is to restrict, in the OX direction, the stroke of the primary beam 63 at a value equal to about 1.5 times the pitch p of the teeth of the associated teethed wheel. As the secondary driving beam of the wheel is integral with and parallel to the primary beam, the movement thereof in the OX direction will also be restricted to 1.5 times the pitch p of the teeth of the associated teethed wheel. As a result, with this pin 53 forming a restriction device, any movement in the OX direction greater than said tooth pitch will cause the teethed wheel to rotate of an angle corresponding to only one tooth. Without this pin 53, any movement Δx (spacing between the anchor areas of Δx) of the structure in the OX direction greater than p would cause the tooth 71 of the secondary beam to move of Δx and the wheel to be rotated of an angle equal to the integer part of the ratio:

$$(\Delta x/p)$$

Finally, the function of the pin 53 is, indirectly, to restrict the movement of the driving beam 64 toward the base 33 of the first sub-assembly 30 of the support 29, with a calibrated value and substantially corresponding to the value of one pitch and a half of the teeth of the first teethed wheel. This pin 53 thus forms means for restricting the stroke of the tooth 71 of the secondary driving beam 64 or, in other words, stop means.

Each of the teeth wheels is provided with a mark 91, formed for example by a straight engraving disposed for example in front of the tooth 71 of the secondary driving beam 64 during the implantation of the sensor and enabling to count the number of cycles of deformations to which the structure is subjected simply by counting the teeth of the teethed wheel located between the mark 97 and the tooth 71 and in the opposite direction of the rotation direction of the wheel.

As shown in FIG. 5, this teethed wheel $54_2$ is provided with teeth 16 on the external peripheral surface 17 thereof and an internal peripheral surface 95, preferably rough, for cooperating with a sleeve 12 integral with the pin 50 in order to create a resistive torque and prevent an autorotation of the teethed wheel.

The secondary beam 64 of the driving means, referred to as driving beam 64 thereafter, is provided with a tooth 71 at the free end 73 thereof, this tooth 71 being able to form a pawl-type gearing with the teeth 16 of said wheel $54_2$.

On this figure, the OX direction indicates the direction of the deformations that can be detected by this sensor while the arrow indicates the normal rotation direction of the counting wheel 54₂. Along this direction, each of the teeth 16 of this teethed wheel 54₂ comprises a first radial surface 23 and a tilted surface 24 connecting the upper end 25 of said first radial surface to the base 26 of the radial surface of the next tooth. Still along this direction, the tooth 71 integral with the driving beam 64 comprises a tilted surface 28 and a radial surface 27, this latter being opposite to said first radial surface 23 of a tooth 16 of the wheel 54₂.

Thus, the tooth 71 of the driving beam has a driving face which comes into contact with a tooth of the teethed wheel so as to rotate this wheel during a movement in one direction of the driving element and a guide face enabling sliding, and thus retraction, of the driving element on the tooth of the teethed wheel during a movement of the driving element in the direction opposite to the above-mentioned one since the teethed wheel is then blocked by the reverse running stop means.

The driving beam has an elasticity sufficient to retract a tooth 16 without deteriorating it. In addition, the driving beam and the reverse running stop beam have a deflection when they are against the wheel. This initial deformation enables to ensure the contact and thus the meshing, despite manufacturing/assembly defects and uncertainties.

Figure 6A:
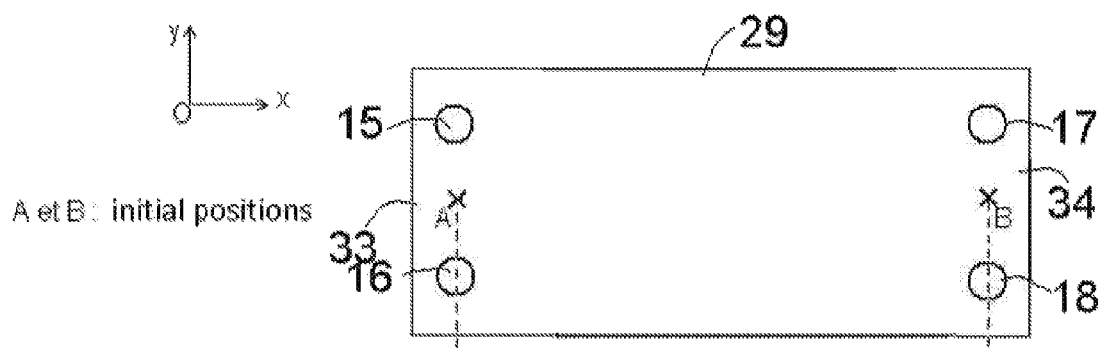
FIGS. 6a and 6b show the operating principle of the microsensor according to the invention.
Figure 6B:
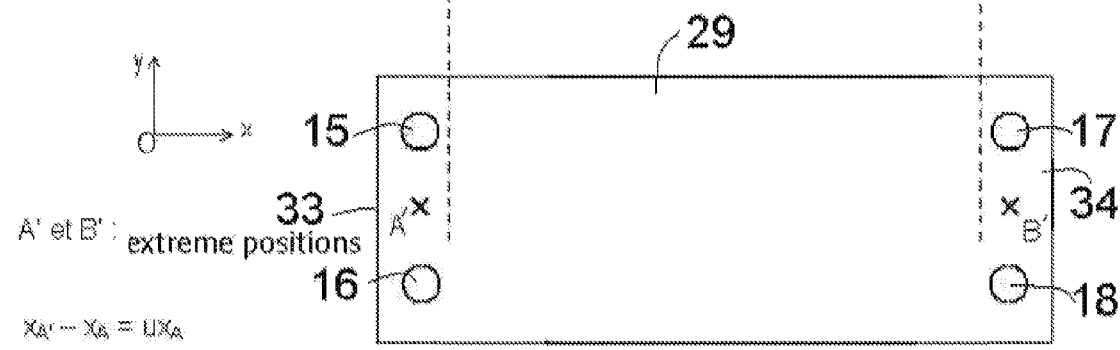

FIGS. 6a and 6b show the operating principle of the microsensor according to the invention.

As shown in these figures, when such a sensor is attached, by both anchor areas 33, 34 thereof, for example by adhesive blocks inserted in the bores 15, 16, 17 and 18, on a structure 49 subjected to a load generating a deformation, for example an elongation only in the OX direction, this deformation of the structure will generate a variation in the spacing between these blocks and thus of the respective centers thereof. Let A and B be the respective centers of the blocks in their initial or normal position and xA and xB the coordinates thereof in the axis OX. When the structure 49 is subjected to a load, spacing between the blocks varies and the points A and B are in the extreme positions A' and B', their coordinates being then xA' and xB' while the blocks come back to their initial position, or a slightly different one, when the load ends or after some time.

The coordinate difference between the initial position and the extreme position is expressed by the following expression:

$$\Delta x = (xA' - xA) - (xB' - xB)$$

$\Delta y = 0$ according to the above-mentioned hypothesis.

This spacing difference between the blocks causes a variation in the positioning between the second portions 41, 44 of the first and second sub-assemblies, respectively 30 and 31. As the teethed wheels 54₁, 54₂ and 54₃ are integral with the second portion 41 of the first sub-assembly 30 and as each of the driving beams 64 comprises a tooth 71 meshed with one of the teethed wheels, said variation in the positioning generates a corresponding drive of the teethed wheels by said driving beams 64 in the direction of the arrow.

As the teethed wheels 54₁, 54₂ and 54₃ have different tooth pitches p1, p2, p3, for example with p1<p2<p3, the deformation $\Delta x$ to which the structure 49 is subjected will be detected or not detected depending on the value thereof and the value of the pitches as indicated in the following table.

| Deformation Δ | Lower than p1 | Included between p1 and p2 | Included between p2 and p3 | Greater than p3 |
|---|---|---|---|---|
| Wheel 54₁ | Non-detection | Detection | Detection | Detection |
| Wheel 54₂ | Non-detection | Non-detection | Detection | Detection |
| Wheel 54₃ | Non-detection | Non-detection | Non-detection | Detection |

Figure 7:
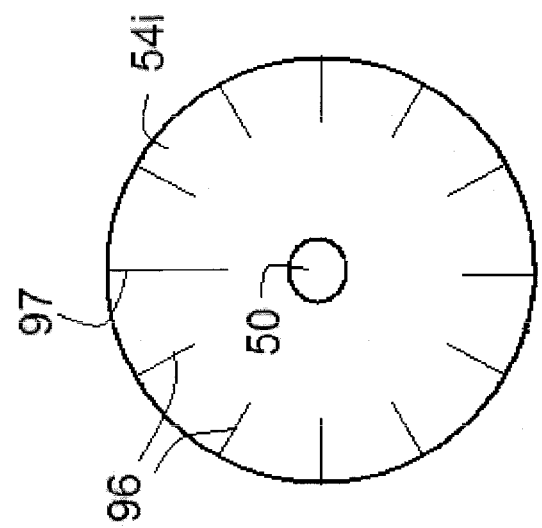
FIG. 7 shows a diagram of a first exemplary embodiment of the means for counting the number of detections.

FIG. 7 shows a diagram of a first exemplary embodiment of means for counting the number of detections, wherein they simply consists in marks, for example engraved on the visible face of the wheel, with a main mark 91 above which the tooth 71 of the secondary driving beam 64 is arranged during the implantation of the sensor and with secondary marks 96 evenly distributed, for example every 50 teeth, on the periphery of the teethed wheel 56i.

However, these counting means do not enable to count a number of successive cycles of deformations greater than the number of teeth of the wheel.

Figure 8:
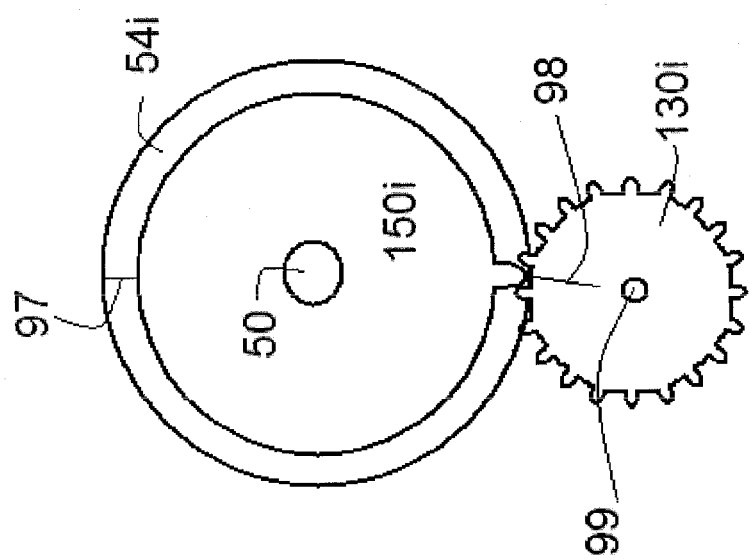
FIG. 8 shows a diagram of a second exemplary embodiment of the means for counting the number of detections.

FIG. 8 shows a diagram of a second exemplary embodiment of means for counting the number of detections enabling to solve the above-mentioned drawback. These counting means comprise:
- a main mark 97 above which the tooth 71 of the secondary driving beam 64 is arranged during the implantation of the sensor,
- a wheel,
- a second teethed wheel 150i coaxially attached on the teethed wheel 54i and comprising only one tooth 151,
- a third teethed wheel comprising for example 20 teeth and capable of being driven of an angle equal to $2\pi/20$ by the tooth 151 at each turn of the teethed wheel 54i.

These means enable to count a number of cycles of deformations between 0 and 20 times the number of teeth on the teethed wheel 54i.

Furthermore, counting optical means can be used for example as those described in the patent application FR2875324.

Figure 9A:
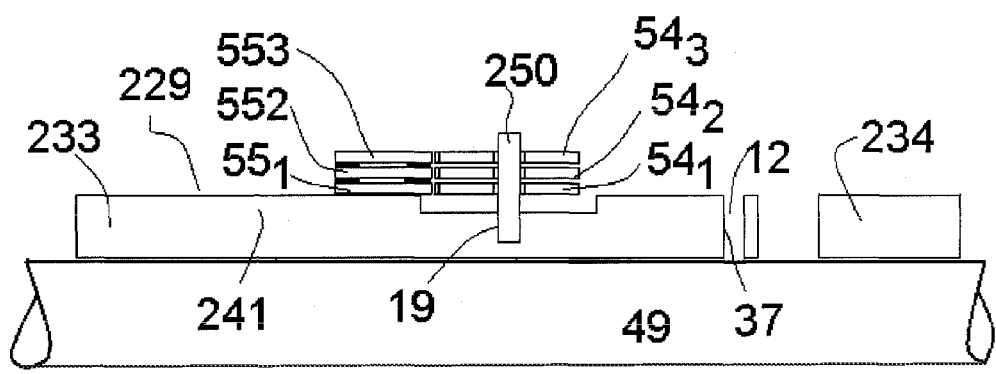
Figure 9B:
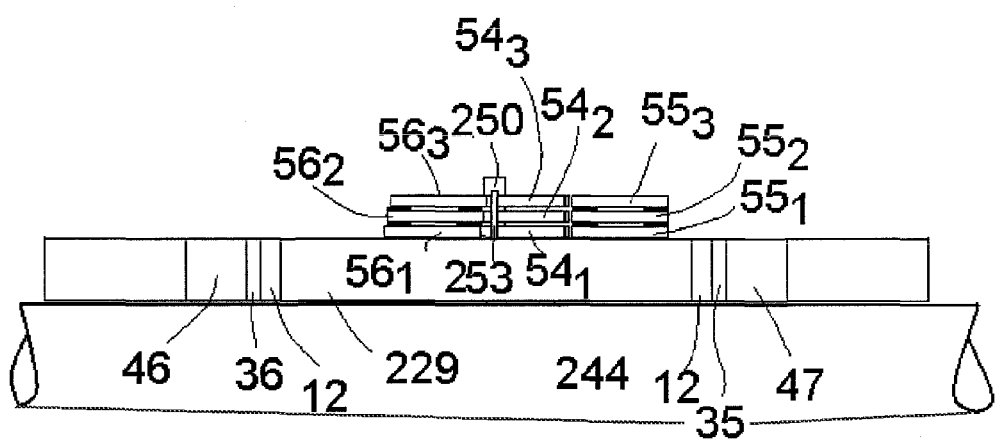

FIGS. 9a and 9b show another alternative embodiment of the invention, FIG. 9a being a longitudinal sectional view in the OX direction, passing through the main axis of the teethed wheels while FIG. 9b is a side view.

In this exemplary embodiment, the support is similar to but shorter than that of FIG. 3. It comprises two opposite anchor areas 233 and 234 partially delimited by notches 46, 47 and first and second longitudinal portions 241, 244 separated by a gap 12. Furthermore, these first and second longitudinal portions 241, 244 are connected to each other, at the ends thereof, by an elastic element, in this case a material strand 35 and 36.

The detecting means comprise three superimposed assemblies, each comprising:
- a teethed wheel 54ᵢ,
- reverse running stop means 55ᵢ,
- driving means 56ᵢ.

The teethed wheels 54₁, 54₂ or 54₃ are moveable about a same pin 250 integral with the support 229 and have different tooth pitches p1, p2 and p3 (with p1>p2>p3), thus enabling to detect three different deformation thresholds. In this exemplary embodiment, they comprise the same number of teeth, that is 1000; thus, the diameters thereof are different, and the one 54ᵢ having the largest diameter and a tooth pitch p1 is arranged first on the pin 250, and then are arranged respectively on the pin 250 the teethed wheel 54₂ and the teethed wheel 54₃, all of these wheels having an overall frustoconical shape, the base of which is facing the first longitudinal portion 241.

The reverse running stop means $55_1$, $55_2$ or $55_3$ are identical, except for the driving tooth which is adapted to the pitch of the corresponding wheel, and are attached one above the other, with an offset such that the tooth of each of them is in contact with a tooth of the corresponding wheel. An O-shaped spacer separates them. These means are identical to those described in FIGS. 4a to 5.

The driving means $56_1$, $56_2$ or $56_3$ are identical, except for the driving tooth which is adapted to the pitch of the corresponding wheel, and attached one above the other, an O-shaped spacer separating them, but they are offset in the OX direction such that, without any deformation, the distance separating the end of the primary beam thereof and the stop 253 is respectively equal to about:

$1.5 \times p1$ for means $56_1$ $1.5 \times p2$ for means $56_2$ $1.5 \times 3$ for means $56_3$ For the counting of cycles of deformation, each teethed wheel is provided at the periphery thereof with a dialing from 0 to 980, with an increment of 20 teeth, and the first longitudinal portion 241 is provided with a straight engraving arranged along the radius of the wheels and at which the number 0 is placed, for each of the wheels, during the insertion of these wheels on the pin 250. In use, as the wheels have different diameters, it is just necessary to perform a visual reading, for each wheel, of the number present at the straight engraving.

The above-described embodiments have, with respect to the prior art, numerous advantages. Thus, the microsensor is entirely passive, and it is the event itself (action of an object able to bend a structure) that provides the power necessary for the operation of the detecting and counting functions.

In this case, the microsensor is operated for a period which is not restricted by the service life of the power supply. Given the very nature of the materials which are used, in this case silicon, the service life of the sensor is in every instance highly greater than that of all weapon systems, including for passive systems stored for very long periods.

In this case, the inert characteristic of the counter enables to contemplate its application to a system operating in pyrotechnic security, which provides a significant progress with respect to current capacities. In addition, a microsensor according to the invention is entirely insensitive to electromagnetic fields.

In addition, it enables to simplify the assembly: less installations (number of tapped holes, bondings, flanges), reduce the cost and increase the discretion.

Furthermore, the proposed solution is very simple to implement and has a highly reliable operating. It is independent from a power supply, discreet and has a low unit cost.

Furthermore, the tooth of the reverse running stop beam can be replaced by a friction pad capable of applying a friction force on the counting teethed wheel. It has a double function. In both cases, it is the friction force of the pad on the wheel that enables it to perform its function. This friction force is determined by the preload of the pad beam. On one hand, it restricts an excessive rotation due to inertial effects of the counting wheel in the normal rotation direction. On the other hand, it prevents a rotation of the counting wheel in the direction opposite to the normal direction during return of the driving tooth, provided that the friction force of the pad is higher than that of the driving beam on the wheel.

Furthermore, in case where one wishes that thermal expansion differences between the sensor and the structure be compensated for, it is preferable, on one hand, to make the supports of the sensor in one material the thermal expansion coefficient of which is close to that of the material of the structure, and, on the other hand, to geometrically compensate this thermal expansion via the shape of said first and second portions of the support and the positioning of the counting wheel.

Furthermore, within the framework of FIG. 5, the connection between the pin 50 and the teethed wheel could be of a pivot type, for example pin/hub type, pin+2 roll bearings, pin+2 plain bearings or pin+2 jewel bearings and the resistive torque could also be ensured by the reverse running stop module.

The invention claimed is:

1. Passive and reversible deformation sensor for deformation cycles in a direction OX of a structure, during cycles of temperatures or mechanical stresses to which the structure is subjected, the sensor comprising:
   means for detecting and, also means for counting, cycles of variations in the distance between two points or areas of a structure,
   a support having first and second portions attachable to, respectively, either of the two points or areas of the structure, wherein the detecting means are associated with the first and second portions of the support,
   wherein the detecting means comprise means for distinguishing between at least two different thresholds of cycles of variations in distance.

2. Passive and reversible sensor according to claim 1, wherein the detecting means comprise at least a first and a second detecting assembly, the at least first and second detecting assemblies comprising at least a first teethed wheel integral with one of the first and second portions and, on one hand, a beam for driving the teethed wheel made integral with one of the end of the beam, with the other of the first and second portions and comprising, at the other end of the beam, a tooth able to form a gearing with the teeth of the first teethed wheel, wherein the tooth pitch p1 of the first teethed wheel of the first assembly is different from the pitch p2 of the first teethed wheel of the second assembly.

3. Passive and reversible sensor according to claim 1, wherein the first and second assemblies are superimposed.

4. Passive and reversible sensor according to claim 1, wherein the first and second assemblies are juxtaposed.

5. Passive and reversible sensor according to claim 1, wherein the first and second portions of the support have a L shape and are arranged head-to-foot, the bases of the Ls forming an anchor area and one of the bases of the Ls being located at one side of the support and the other at the opposite side of the support.

6. Passive and reversible sensor according to claim 1, wherein the ends of the first and second portions of the support are connected to each other by an elastic element.

7. Passive and reversible sensor according to claim 1, wherein the passive and reversible sensor comprises sequentially, in a direction OX, a first anchor area integral with one of the first and second portions of the support, at least first and second detecting assemblies, and a second anchor area integral with the other portion.

8. Passive and reversible sensor according to claim 2, wherein the assemblies are provided with reverse running stop means associated with the first teethed wheel, the reverse running stop means comprising a beam integral, at one of the ends of the beam, with the first portion of the support and comprising, at the other end of the beam, at least one tooth able to mesh with the teeth of the teethed wheel and, the reverse running stop device comprises a tooth able to mesh with the first teethed wheel, the tooth as well as one of the driving beam and the teeth of the first teethed wheel comprising a radial surface and a tilted surface connecting the end of the radial surface of the tooth to the base of the radial surface of the next tooth.

9. Passive and reversible sensor according to claim 2, wherein the assemblies are provided with 9-shaped driving means, having a first O-shaped rigid portion attached to the second portion of the support, a second elastic portion, one end of the second elastic portion being integral with the first portion while the opposite end is integral with a third portion comprising a primary beam and a secondary beam, the secondary beam comprising a tooth at the free end of the secondary beam.

10. Passive and reversible sensor according to claim 9, wherein the first portion of the support is provided with a stop able to restrict the stroke of the secondary beam.

\* \* \* \* \*